(12) United States Patent
Hilliard

(10) Patent No.: US 9,918,551 B2
(45) Date of Patent: Mar. 20, 2018

(54) WALL-MOUNTED RETIARY STORAGE AND DISPLAY SYSTEM

(71) Applicant: Dorothy Jean Hilliard, Port Orchard, WA (US)

(72) Inventor: Dorothy Jean Hilliard, Port Orchard, WA (US)

( * ) Notice: Subject to any disclaimer, the term of this patent is extended or adjusted under 35 U.S.C. 154(b) by 0 days.

(21) Appl. No.: 15/409,476

(22) Filed: Jan. 18, 2017

(65) Prior Publication Data
US 2017/0208944 A1 Jul. 27, 2017

Related U.S. Application Data

(60) Provisional application No. 62/286,365, filed on Jan. 23, 2016.

(51) Int. Cl.
*A47B 95/00* (2006.01)
*F16B 2/26* (2006.01)

(52) U.S. Cl.
CPC .............. *A47B 95/008* (2013.01); *F16B 2/26* (2013.01)

(58) Field of Classification Search
CPC ........ A47B 95/008; F16B 2/26; A47F 5/0807; A47F 5/0815; A47F 5/083; A47F 5/0823; A47F 7/02; A47F 7/03; Y10S 206/806; A45C 11/16; A45C 7/0095; A47G 1/12
USPC ........................... 211/113, 118, 85.2; 206/6.1
See application file for complete search history.

(56) References Cited

U.S. PATENT DOCUMENTS

| | | | | |
|---|---|---|---|---|
| 4,223,783 A | * | 9/1980 | Marshall | B65D 85/30 150/901 |
| 4,401,219 A | * | 8/1983 | Mink | A45C 7/0095 206/466 |
| 4,735,246 A | * | 4/1988 | Niehaus | A45C 7/0095 206/479 |
| 4,767,011 A | * | 8/1988 | Butler | A47F 7/02 206/486 |
| 4,787,516 A | * | 11/1988 | Morrison | A47F 7/02 206/205 |
| 4,821,883 A | * | 4/1989 | Miller | A45C 7/0095 206/225 |
| 4,905,821 A | * | 3/1990 | Corbett | A47G 1/12 206/45.24 |
| 4,923,069 A | * | 5/1990 | Germain | A47F 7/02 206/495 |
| 4,958,727 A | * | 9/1990 | Bergeron | A45C 9/00 206/489 |
| 5,025,918 A | * | 6/1991 | Bergeron | A45C 9/00 206/495 |
| 5,031,758 A | * | 7/1991 | Gonzalez | A47F 7/02 206/6.1 |
| 5,050,745 A | * | 9/1991 | Sanders | A45C 11/16 206/495 |
| 5,071,000 A | * | 12/1991 | Stewart | A45C 11/16 206/45.24 |

(Continued)

*Primary Examiner* — Patrick D Hawn
(74) *Attorney, Agent, or Firm* — Galvin Patent Law LLC; Brian R. Galvin

(57) ABSTRACT

A compact, wall-mounted retiary storage and display system comprising a planar, regular quadrilateral polygonal-type shape formed of a sturdy, lightweight material with a retiary region formed of regularly spaced columns and rows of fiber bordered by a durable and flexible sheath. System is mounted to a surface by a hardware subassembly with applied horizontal tension from a shock cord loop subassembly.

2 Claims, 4 Drawing Sheets

(56) References Cited

U.S. PATENT DOCUMENTS

| | | | | |
|---|---|---|---|---|
| 5,121,833 A | * | 6/1992 | Lindsay | A45C 7/0095 206/18 |
| 5,141,113 A | * | 8/1992 | Elliott | A47F 7/02 206/495 |
| 5,168,986 A | * | 12/1992 | Stenhouse | A47F 7/02 206/45.24 |
| 5,209,344 A | * | 5/1993 | Smith | A45C 11/16 206/466 |
| 5,246,103 A | * | 9/1993 | Hicks | A45C 11/16 206/495 |
| 5,253,750 A | * | 10/1993 | Keffer | A47F 7/02 206/566 |
| 5,259,497 A | * | 11/1993 | Brothers | A45D 8/185 206/6.1 |
| 5,261,529 A | * | 11/1993 | Holland | A47F 7/02 206/486 |
| 5,295,587 A | * | 3/1994 | Downes | A47G 25/14 206/495 |
| 5,333,727 A | * | 8/1994 | Hoppe | A47G 29/08 206/486 |
| 5,358,099 A | * | 10/1994 | Tavone | A47F 7/03 206/6.1 |
| 5,363,953 A | * | 11/1994 | Carter | A45C 11/16 206/495 |
| 5,390,800 A | * | 2/1995 | Tucker | A47F 11/10 206/495 |
| 5,419,063 A | * | 5/1995 | Lane | A45C 11/16 206/6.1 |
| 5,427,230 A | * | 6/1995 | Mattox | A47G 25/14 206/478 |
| 5,680,928 A | * | 10/1997 | Carr | A47F 7/02 206/6.1 |
| 5,779,033 A | * | 7/1998 | Roegner | A45C 11/16 206/6.1 |
| 5,950,815 A | * | 9/1999 | Yetman-Bellows | A47F 7/02 206/6.1 |
| 5,957,308 A | * | 9/1999 | Zierenberg | A47B 81/005 211/118 |
| 6,422,383 B1 | * | 7/2002 | LaMarca | A47F 7/03 206/6.1 |
| 6,474,466 B1 | * | 11/2002 | Barahona | A45C 11/16 206/495 |
| 7,059,073 B2 | * | 6/2006 | Beach | G09F 1/10 206/495 |
| 7,389,868 B2 | * | 6/2008 | Lewand | A45C 11/16 206/495 |
| 7,806,255 B1 | * | 10/2010 | Staver | A45C 11/16 206/6.1 |
| 8,151,980 B2 | * | 4/2012 | DeMartino | A47G 29/08 206/495 |
| 8,727,110 B2 | * | 5/2014 | Walsh | A45C 11/16 206/6.1 |
| 8,800,789 B2 | * | 8/2014 | Sharp | A47F 7/02 211/85.2 |
| 2006/0180481 A1 | * | 8/2006 | McGaughey, Sr. | A47F 7/02 206/6.1 |
| 2008/0060951 A1 | * | 3/2008 | Pantelis | A45C 11/00 206/6.1 |
| 2008/0185299 A1 | * | 8/2008 | Thorman | A47F 7/02 206/6.1 |
| 2011/0011753 A1 | * | 1/2011 | DeMartino | A47G 29/08 206/6.1 |
| 2012/0138555 A1 | * | 6/2012 | Ward | A45C 11/16 211/85.2 |
| 2013/0068919 A1 | * | 3/2013 | Antonioni | F16M 13/00 248/614 |
| 2013/0140256 A1 | * | 6/2013 | Sharp | A47F 7/02 211/85.2 |
| 2013/0256159 A1 | * | 10/2013 | Walsh | A45C 11/16 206/6.1 |
| 2014/0246338 A1 | * | 9/2014 | Robby | A47F 7/02 206/6.1 |
| 2014/0263116 A1 | * | 9/2014 | Wojciechowski | A47F 5/0807 211/85.2 |

* cited by examiner

WALL-MOUNTED RETIARY STORAGE AND DISPLAY SYSTEM

CROSS-REFERENCE TO RELATED APPLICATIONS

This application claims the benefit of and priority to U.S. patent application Ser. No. 62/286,365 titled "Wall Storage System, Hand Tools" and filed on Jan. 23, 2016, the entire specification of which is incorporated herein by reference in its entirety.

BACKGROUND OF THE INVENTION

Field of the Art

The disclosure relates to the field of wall storage and display systems, and more particularly to a wall-mounted retiary display and storage system.

Discussion of the State of the Art

In the field of wall storage and display systems, some of the desirable attributes include space savings, simplicity of installation, and ease of removing and replacing items. Users unfortunately have a very limited number of systems to choose from and those usually require a large space and are difficult to install. The attending usability issues may cause the stored items to suffer a deferred return, precarious or incorrect positioning on the system, or temporary or permanent loss of the item.

One type of storage and display system has gridded sets of holes (pegboard systems); while another is based on a panel with specially cut horizontal grooves (slat-wall systems). Both systems require the purchase of a variety of exclusively created attachments and implements such as hooks, racks, and pegs in order for items to be affixed to the systems. While both the pegboard and slat-wall systems provide excellent visibility, they fall short in installation and usability. Pegboard and slat-wall systems can be quite large, taking up a sizeable amount of space on a wall and can be difficult to install due to size and weight. Frequently a sub foundation is required before installation may begin. Users become frustrated when item retrieval is hindered by system components or other stored items. Also wearisome is the need for precision item placement within system to minimize possibility of items falling off or colliding with other items. Planning the arrangement of attachments and items is time consuming and further raises the complexity of using the storage and display system. Furthermore, the exclusive attachments are known to release spontaneously from their respective systems when items are taken from display. This requires the user to spend time locating and reinstalling the missing attachment before returning the item to the system.

What is needed, is a means to provide the user with a small, lightweight storage and display system that is easy to assemble and install and requires minimal to no attachments. This storage and display system means to provide ease of access to items, clear visibility, ease of returning items to the system as well as a capacity that is better than or equal to current systems.

SUMMARY OF THE INVENTION

Accordingly, the inventor has conceived and reduced to practice, in a preferred embodiment of the invention, a compact lightweight tensioned retiary storage and display system that can be mounted to a wall or a movable, flat surface. System is tensioned to gently clasp items between system and mounting surface, thereby reducing the need for additional attachment and implements. System also maintains a capacity equivalency with current systems while taking up less space.

In a preferred embodiment of the system a wall-mounted retiary storage and display apparatus, comprising a planar, regular quadrilateral retiary region bounded by a rigid frame comprising four frame pieces is disclosed. The retiary region has regularly spaced rows and columns of fiber, whereby openings are formed between successive pairs of rows and columns. An upper and a lower edge of the retiary region each terminates in a flexible sheath. A first frame piece slides into the flexible sheath on the upper edge, a second frame piece slides into the flexible sheath on the lower edge, the third and fourth frame pieces are attached at opposite ends to the first and second frame pieces by means of engineered corners to complete the frame. The frame supplies a slight vertical tension to the retiary region. The frame corners are supplied with holes to accept the installing hardware. Once mounted to a flat surface, horizontal tension is applied to the retiary region by installing shock cord loops along the vertical edges of the retiary region. The shock cord loops are held in place by the systems installing hardware. Items to be stored and displayed on the invention may be applied by dropping the item into an opening of the retiary fabric, weaving an item in and out of the retiary fabric, hooking or hanging an item on the retiary fabric via the items own appendages or through use of generic hooks, loops and rings.

In another preferred embodiment of the system a wall-mounted retiary storage and display apparatus, comprising a planar, regular quadrilateral retiary region bounded atop and beneath by rigid slats with holes at each end for placement of installing hardware is disclosed. The retiary region has regularly spaced rows and columns of fiber, whereby openings are formed between successive pairs of rows and columns. An upper and a lower edge of the retiary region each terminates in a flexible sheath. A first slat slides into the flexible sheath on the upper edge, a second slat slides into the flexible sheath on the lower edge. The user installs this partial assembly on the wall placing the installing hardware in holes on each end of the slats. The consumer must apply a slight vertical tension to the retiary region by strategic placement of the sheathed slats during installation. In this embodiment, there are only two horizontal rigid sides and no engineered corners. Horizontal tension is then applied to the retiary region by installing shock cord loops along the vertical edges of the retiary region. The shock cord loops are held in place by the installing hardware. Items to be stored and displayed on the invention may be applied by dropping the item into an opening of the retiary fabric, weaving an item in and out of the retiary fabric, hooking or hanging an item on the retiary fabric via the items own appendages or through use of generic hooks, loops and rings.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Detailed Description of Exemplary Embodiments

Figure 1:
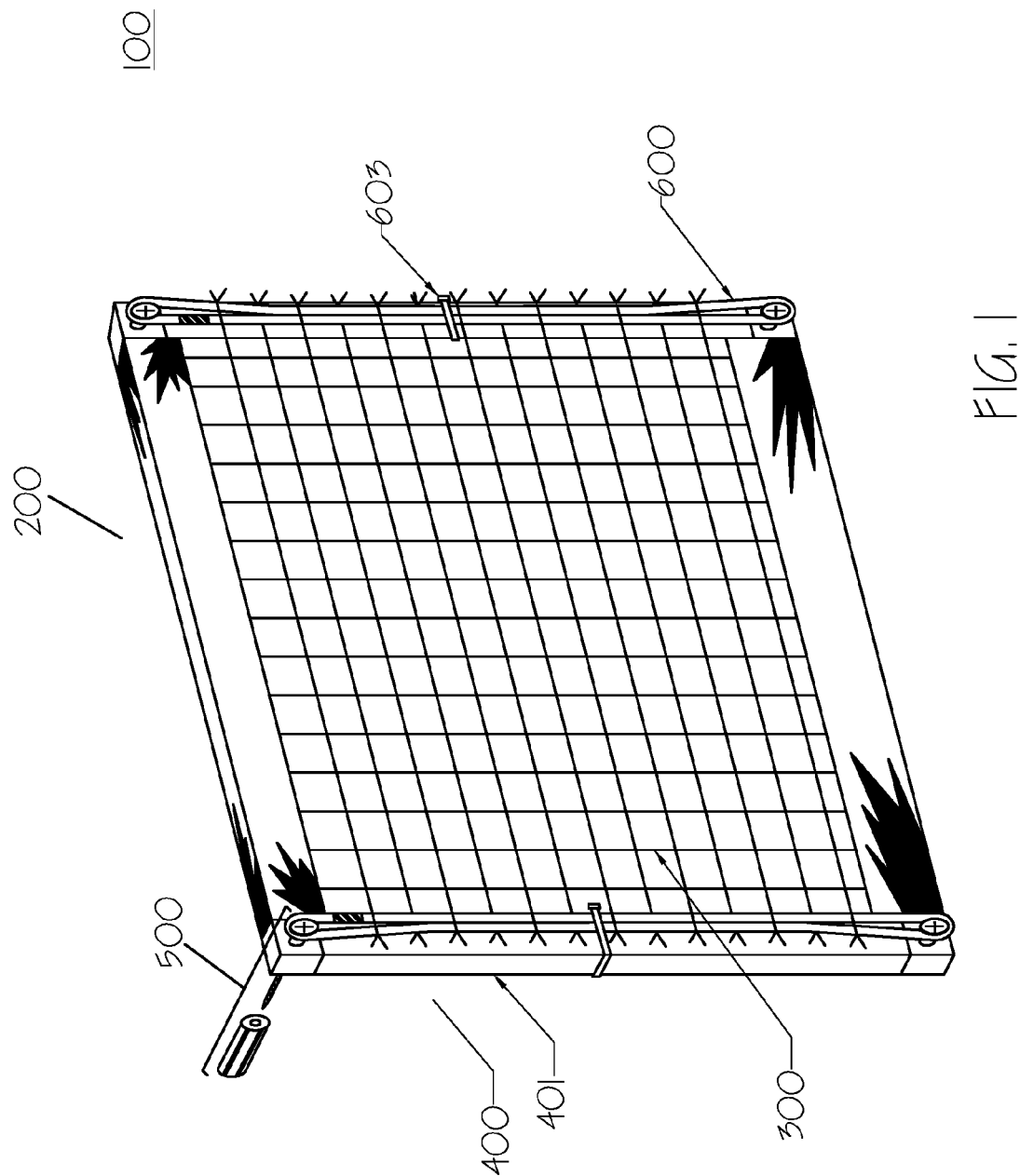
FIG. 1 is an illustration of an exemplary retiary storage and display system according to a preferred embodiment of the invention, illustrating the device with all main components, subassemblies, and optional parts assembled.

FIG. 1 is an illustration of an exemplary retiary storage and display system 100 according to a preferred embodiment of the invention, illustrating the device with all main components, subassemblies, and optional parts 200-603 assembled.

According to the embodiment, a retiary storage and display system 100 may comprise a generally quadrilateral polygonal-type shape such as a square; having a sturdy, lightweight frame subassembly 400 formed of a material such as metal, wood, or a rigid plastic (it should be appreciated that other forms of retiary storage and display systems may be used such as but not limited to; other polygonal shapes such as convex polygons [regular polygons] including but limited to triangles, parallelograms, diamonds, and others; or irregular polygons such as rhombi, rectangles, trapeziums, and other shapes as well according to a preferred use basis of the invention). Frame subassembly 400 is merged with retiary subassembly 300 to form primary body subassembly 200 of system, which can then be secured to a wall or other flat surface at each corner 402 (FIG. 2) of frame subassembly 400 with hardware subassembly 500. Once subsystem 200 is secured to a surface, tension loop subassembly 600 may be installed to complete system 100. An optional tie-in 603 such as a plastic strip with serrations on one end that lock inside an opening on the other end, cable or other material, may be installed for additional support with use of heavier objects within system 100. Tie-in 603 installs midway on vertical frame sides 401 and encircles both frame side 401 and tension loop subassembly 600 before being fully secured to system 100.

Figure 2:
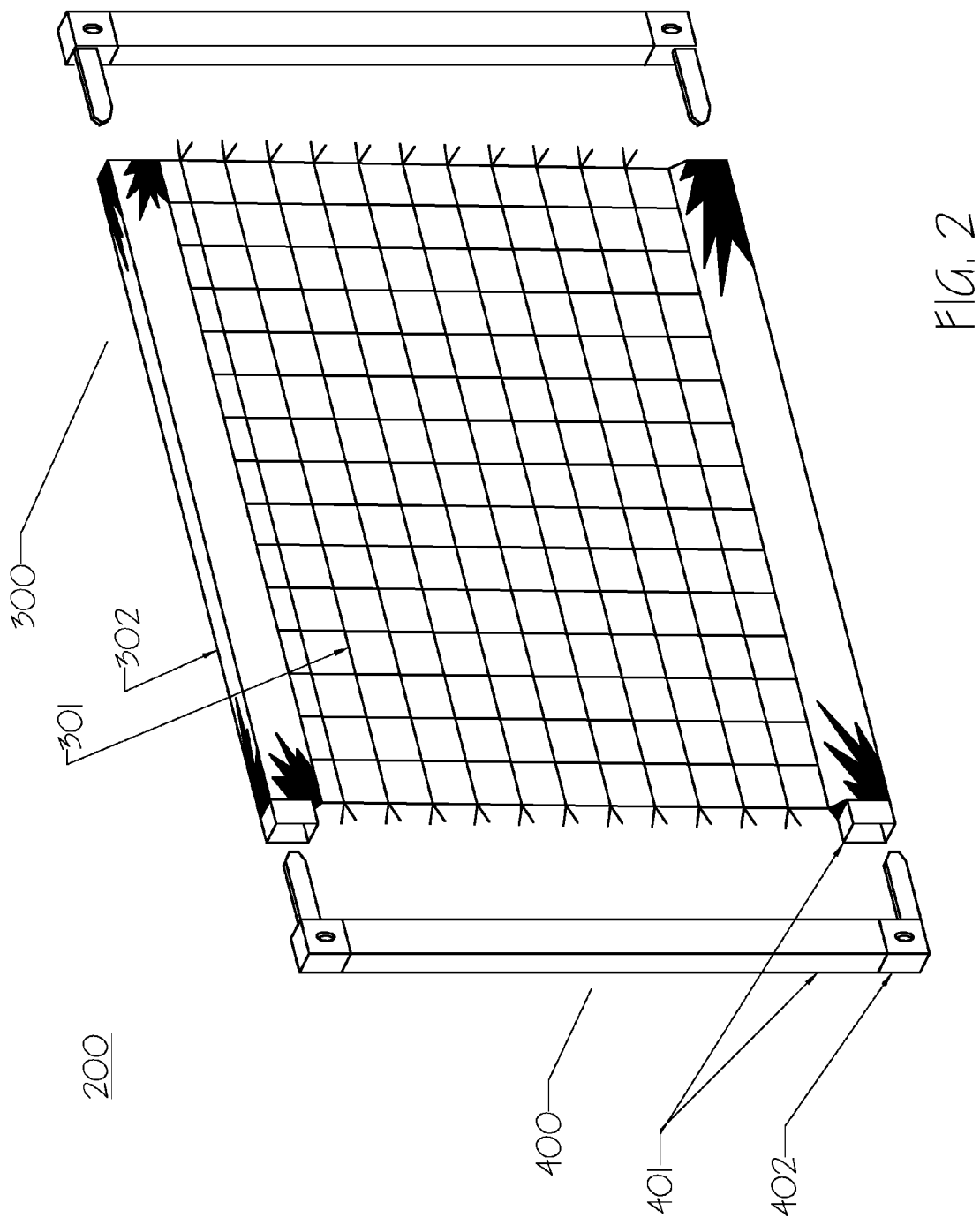
FIG. 2 is an illustration of an exemplary assembly method of main body of invention according to a preferred embodiment of the invention, illustrating frame and retiary subassemblies.

FIG. 2 is an illustration of an exemplary assembly method 200 of main body of invention according to a preferred embodiment of the invention, illustrating frame 400 and retiary 300 subassemblies. According to the embodiment, retiary subassembly 300 is comprised of a retiary fabric 301 comprised of a textile or other substance such as a reticulated fiber. Retiary fabric 301 has uniformly spaced rows and columns of braided, twisted, or other reticulated string or other fiber, whereby open spaces are formed between successive pairs of rows and columns (one knowledgeable in retiary products will recognize available variety of opening [spaces between rows and columns] sizes and fiber strengths). Attached to retiary fabric 301 at both upper and lower edge is border 302 comprised of a durable textile. Border 302 attaches to retiary fabric 301 by sewing (it should be appreciated that other methods of attachment may be used according to a preferred use basis of the invention) edges of border 302 to edges of retiary fabric 301 to form flexible sheaths for horizontal frame pieces 401 (or for slats 403 for an alternative use of the embodiment) to fit into. Vertical frame pieces 401 are fitted with corners 402 which are likewise fitted to horizontal frame pieces 401 sheathed in border 302. Centers of corners 402 are drilled for easier installation to a surface.

Figure 3:
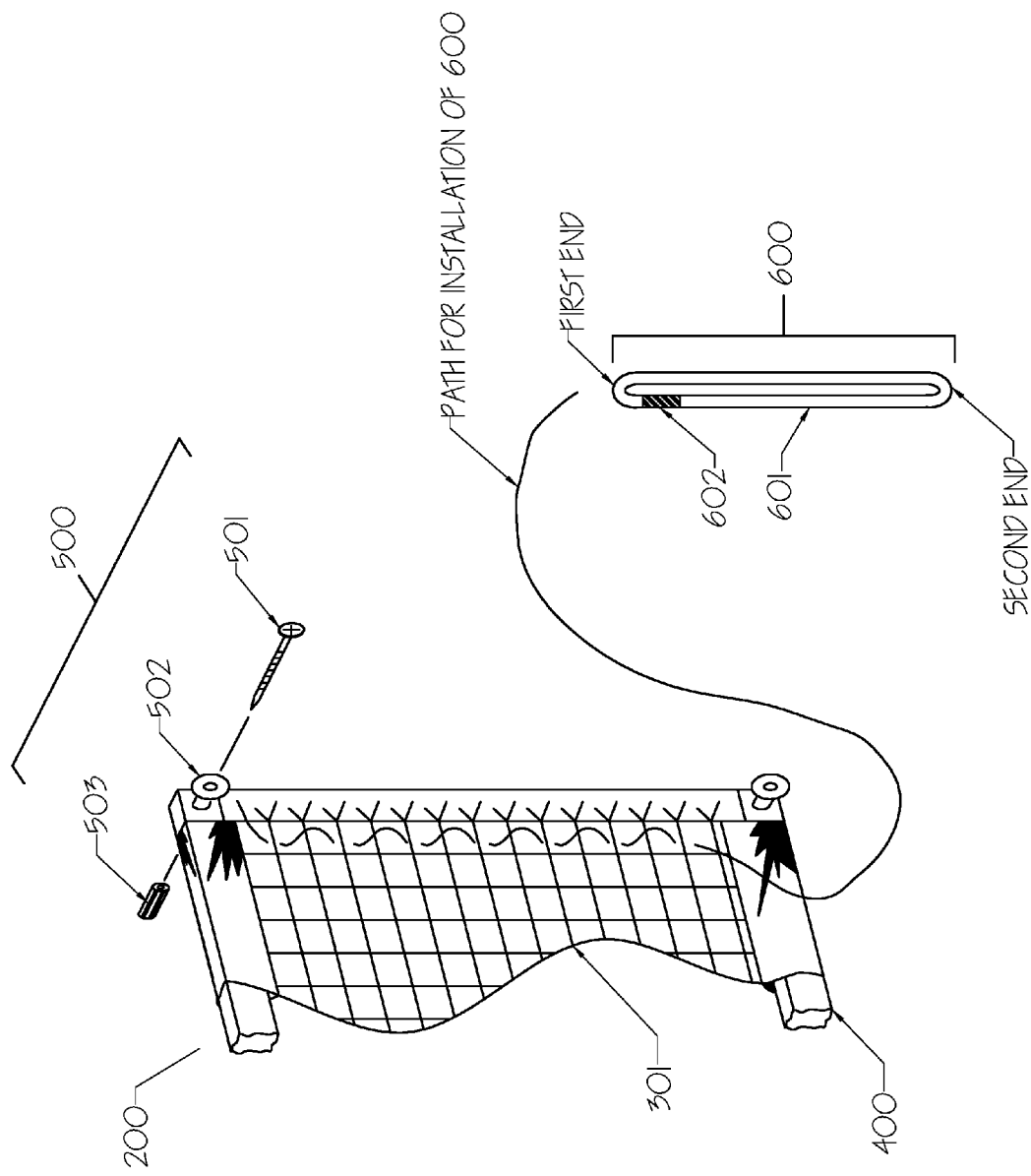
FIG. 3 is an illustration of exemplary subassemblies for tension loop and hardware according to a preferred embodiment of the invention, illustrating the subassemblies' components and installation.

FIG. 3 is an illustration of exemplary subassemblies for hardware 500 and tension loop 600 according to a preferred embodiment of the invention, illustrating the subassemblies' 500, 600 components and installation. Hardware subassembly 500 is comprised of metal screws 501 such as a sheet metal screw or a wood screw with a standard slotted head or Phillips head (it should be appreciated that any mounting screw with compatible diameters and lengths may be used according to a preferred use basis of the invention), a bearing 502 such as a flange bearing comprised of a sturdy plastic material, to support tension loop subassembly 600 and an optional wall anchor 503 comprised of soft lead, metal, or a plastic depending on the receiving surface. Wall anchors 503 are often used to stabilize fasteners in friable wall surfaces (such as drywall) or otherwise difficult wall surfaces (such as masonry) and are placed into the mounting surface at the exact location intended for screw 501 prior to mounting the main body 200 on wall. Screw 501 is inserted through bearing 502 and then through corner 402 before penetrating wall surface or wall anchor 503. Once main body subassembly 200 is installed on a flat surface, tension loop subassembly 600 may be installed. Tension loop subassembly 600 is comprised of a shock cord 601 (or other material such as an elastic cord may be used according to a preferred use basis of the invention) which is fastened into a continuous loop with crimp 602 which is comprised of a metal. Tension loop subassembly 600 provides horizontal tension across width of retiary fabric 301. Installation of tension loop 600 begins at bottom edge of retiary fabric 301 and is woven in and out of open spaces in outermost column of fabric 301. First end of tension loop 600 is hooked over bearing 502; tension loop 600 is then stretched downward while maintaining woven aspect through fabric 301, until second end of tension loop 600 can be hooked over vertically opposing bearing 502. Tension loop subassembly 600 is shorter than main body subassembly 200 thereby adding horizontal tension to fabric 301, which in turn stabilizes items installed into system 100 against wall or flat surface.

Figure 4:
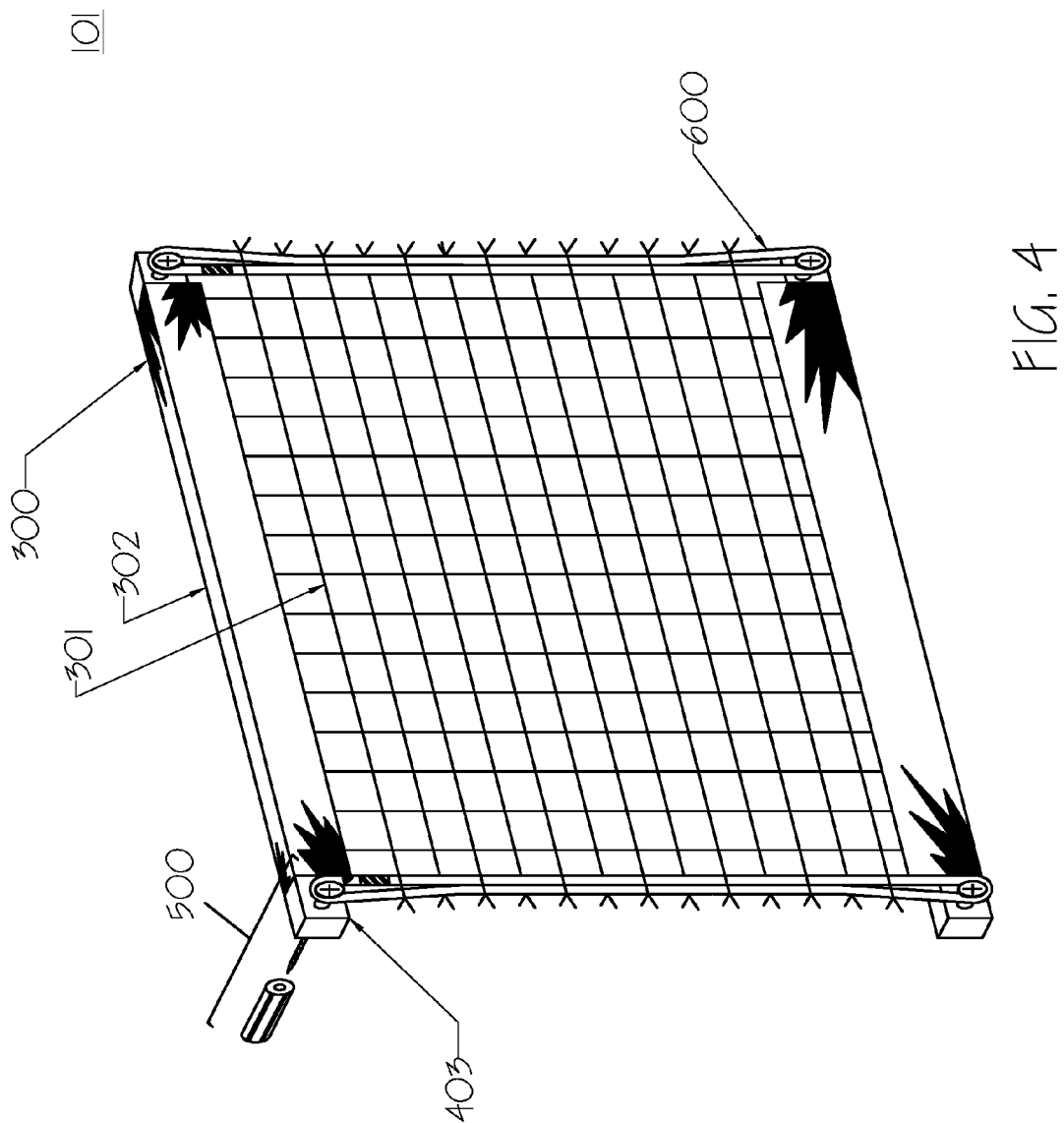
FIG. 4 is an illustration of an exemplary alternative assembly of retiary storage and display system according to a preferred embodiment to the invention, illustrating a variation of frame assembly from a four-piece frame to a two-slat frame.

FIG. 4 is an illustration of an exemplary alternative assembly 101 of retiary storage and display system according to a preferred embodiment to the invention, illustrating a variation of frame assembly from a four-piece frame to a two-slat frame 403. Alternative assembly 101 may comprise a generally regular, quadrilateral polygonal-type shape such as a square; having sturdy, lightweight slats 403 comprised of a material such as metal, wood, or a rigid plastic. Slats 403 are longer than durable border 302 and have a pre-drilled hole in center of each slat 403 end to accommodate hardware subassembly 500. After inserting slat 403 into upper border sheath 302 of retiary subassembly 300, system should then be installed to wall or other flat surface using hardware subassembly 500. Second slat 403 is then inserted into bottom border sheath 302 of retiary subassembly 300 creating mild vertical tension to the retiary fabric, and is then installed to surface with hardware 500. Once main system 101 is installed to surface, tension loop subassembly 600 may be installed. Tension loop subassembly 600 is comprised of a shock cord 601 (or other material such as an elastic cord may be used according to a preferred use basis of the invention) which is fastened into a continuous loop with crimp 602 which is comprised of a metal. Tension loop subassembly 600 provides horizontal tension across width of retiary fabric 301. Installation of tension loop 600 begins at bottom edge of retiary fabric 301 and is woven in and out of open spaces in outermost column of fabric 301. First end of tension loop 600 is hooked over hardware subassembly 500; tension loop 600 is then stretched downward while maintaining woven aspect through fabric 301, until second end of tension loop 600 can be hooked over vertically opposing hardware subassembly 500. Tension loop subassembly 600 is shorter than main body subassembly 101 thereby adding horizontal tension to fabric 301, which in turn stabilizes items installed into system 101 against wall or flat surface.

The skilled person will be aware of a range of possible modifications of the various embodiments described above. Accordingly, the present invention is defined by the claims and their equivalents.

What is claimed is:

1. An apparatus for a wall-mounted retiary storage and display system, comprising:
 a planar, regular quadrilateral retiary region bounded by a rigid frame comprising four frame pieces, one per edge of the retiary region;
 wherein the retiary region comprises regularly spaced rows and columns of reticulated braided or twisted fiber, whereby openings are formed between successive pairs of rows and columns;
 wherein an upper and a lower edge of the retiary region each terminates in a flexible sheath fastened to or comprising a row;
 wherein a first frame piece slides into the flexible sheath on the upper edge, a second frame piece slides into the flexible sheath on the lower edge, and the remaining two frame pieces are attached at opposite ends to the first and second frame pieces; and
 wherein the retiary region comprises a tension loop assembly comprising a shock cord loop woven between the openings of the outermost columns of retiary fabric and supported by a bearing.

2. The apparatus of claim 1, wherein a tie-in for additional tension and support attaches a tension loop installed in the retiary region to the system frame.

\* \* \* \* \*